（12） United States Patent
Zhang et al.

(10) Patent No.: US 8,056,186 B2
(45) Date of Patent: *Nov. 15, 2011

(54) AUTOMATICALLY OPENING HINGE ASSEMBLY FOR PORTABLE ELECTRONIC DEVICES

(75) Inventors: Yu Zhang, Shenzhen (CN); Wu-Chun Zeng, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 437 days.

This patent is subject to a terminal disclaimer.

(21) Appl. No.: 12/334,653

(22) Filed: Dec. 15, 2008

(65) Prior Publication Data
US 2010/0050382 A1 Mar. 4, 2010

(30) Foreign Application Priority Data

Aug. 26, 2008 (CN) .......................... 2008 1 0304211

(51) Int. Cl.
*E05F 1/08* (2006.01)
(52) U.S. Cl. ................ 16/303; 16/330; 16/326
(58) Field of Classification Search ............... 16/367, 16/386, 338–340, 330, 303, 380, 326, 324; 361/679.06, 679.27, 679.28, 679.11, 679.12, 361/679.13; 379/433.12, 433.13; 455/575.1, 455/575.4, 575.8, 550.1, 90.3; 348/373, 348/333.06, 794
See application file for complete search history.

(56) References Cited

U.S. PATENT DOCUMENTS

| | | | | |
|---|---|---|---|---|
| 6,886,221 B2* | 5/2005 | Minami et al. | .................. | 16/324 |
| 7,007,345 B2* | 3/2006 | Nakase et al. | .................. | 16/330 |
| 7,117,562 B2* | 10/2006 | Zuo et al. | ......... | 16/303 |
| 7,184,275 B2* | 2/2007 | Yamaguchi et al. | .......... | 361/755 |
| 7,847,194 B2* | 12/2010 | Kuwajima et al. | .......... | 174/161 R |
| 7,895,710 B2* | 3/2011 | Takagi et al. | .................. | 16/330 |
| 2005/0220294 A1* | 10/2005 | Gupte | ...................... | 379/433.13 |
| 2006/0032020 A1* | 2/2006 | Duan et al. | ...................... | 16/288 |
| 2006/0174443 A1* | 8/2006 | Takagi et al. | .................. | 16/330 |
| 2007/0094843 A1* | 5/2007 | Yang | .............................. | 16/330 |
| 2008/0092335 A1* | 4/2008 | Hu et al. | ......................... | 16/308 |
| 2010/0024165 A1* | 2/2010 | Kosugi et al. | .................. | 16/303 |

* cited by examiner

*Primary Examiner* — Chuck Y. Mah
(74) *Attorney, Agent, or Firm* — Altis Law Group, Inc.

(57) ABSTRACT

A hinge assembly (100) includes a cam (13), a follower (14), a first spring (12), a control member (18) and a second spring (16). The cam has a cam surface. The follower has a latching cam surface engaging with the cam surface. The first spring provides an elastic force causing the cam surface of the cam and the latching cam surface of the follower to resist each other. The control member slidably resists the follower. The second spring provides an elastic force to return the control member. The control member is movable to push the follower to rotate to realize the cam surface of the cam to rotate relative to the latching cam surface of the follower.

16 Claims, 7 Drawing Sheets

AUTOMATICALLY OPENING HINGE ASSEMBLY FOR PORTABLE ELECTRONIC DEVICES

BACKGROUND OF THE INVENTION

1. Field of the Invention

The present invention relates to hinge assemblies and, particularly, to an automatically opening hinge assembly for foldable devices such as portable telephones, portable computers, and so on.

2. Discussion of the Related Art

At present, one of the most popular portable electronic device in the marketplace is the foldable cellular telephone, which generally includes a cover section and a body section. The cover section and the body section are rotatably interconnected through a hinge assembly, for switching the telephone between an in-use position and a closed position.

One kind of hinge assembly employs a cam and a follower, which allows the cover section to fold outwards from the body section and then be held in an open position. The hinge assembly typically includes a cam having a concave portion, a follower having a convex portion, a shaft having a fixing end, and a spring. The cam and the follower are placed around the shaft. The spring resists the follower to make the concave portion tightly contact the convex portion. The cam, the follower, the shaft and the spring are received in a housing. A flip cover rotates about a main body of the mobile phone by overcoming the force of the spring, thus allowing the concave portion to rotate about the convex portion. However, a user must typically open the mobile phone using both hands. This makes the mobile phone awkward to use in situations when the user has only one hand free.

Therefore, there is a room for improvement within the art.

BRIEF DESCRIPTION OF THE DRAWINGS

Many aspects of the hinge assembly can be better understood with reference to the following drawings. The components in the drawings are not necessarily to scale, the emphasis instead being placed upon clearly illustrating the principles of the present hinge assembly. Moreover, in the drawings, like reference numerals designate corresponding parts throughout the several views, in which.

DETAILED DESCRIPTION OF THE EMBODIMENTS

Figure 1:
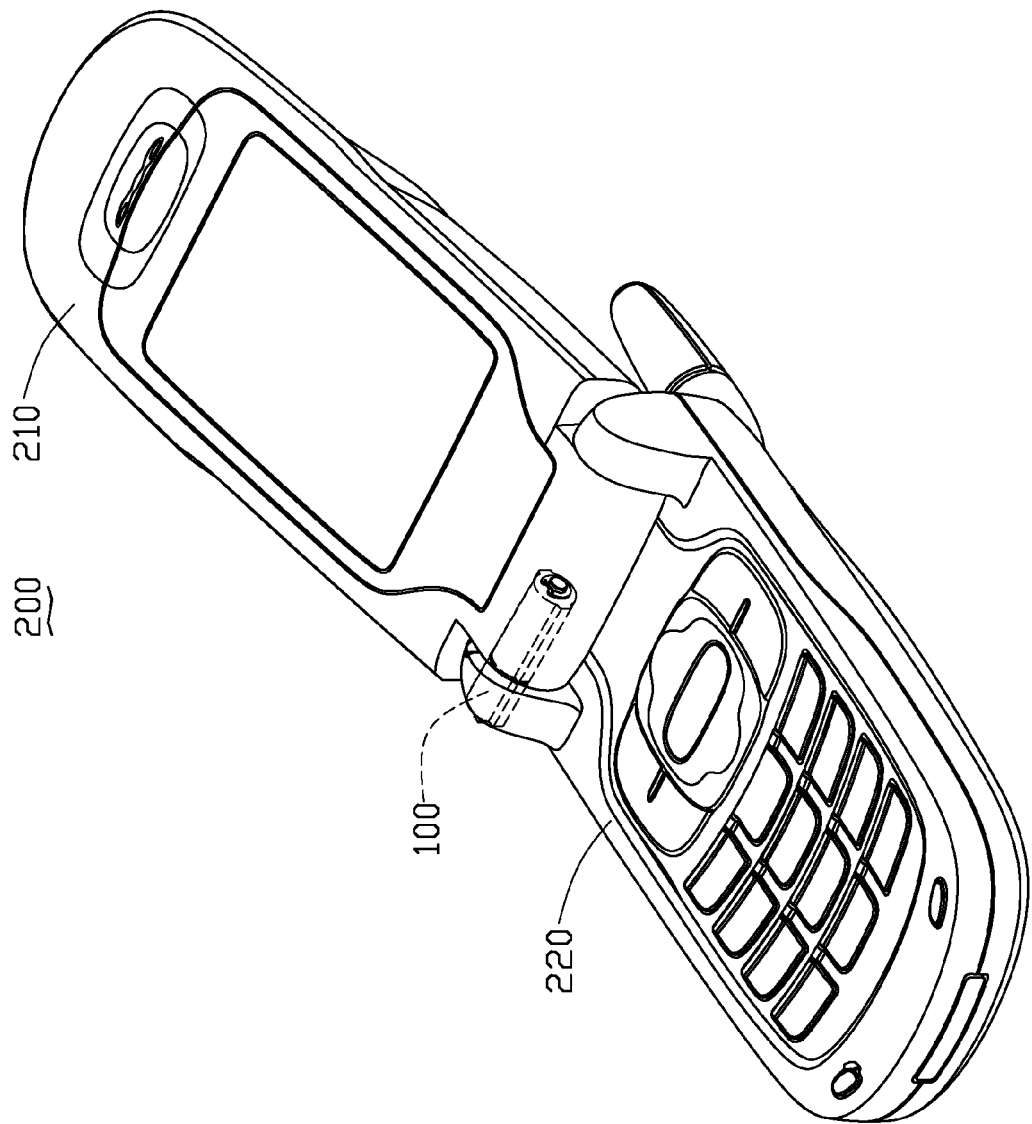
FIG. 1 is an isometric view of an exemplary embodiment of the present hinge assembly, as used in a mobile phone.

Referring now to the drawings in detail, FIG. 1 shows a hinge assembly 100, applied to a foldable electronic device 200 such as a flip type mobile phone, for pivotably coupling a cover section 210 and a body section 220. It is to be understood, however, that the hinge assembly 100 could be advantageously used in other environments (e.g. cabinet doors). As such, although proving particularly advantageous when used in foldable electronic devices, the hinge assembly 100 should not be considered limited in scope solely to foldable electronic devices.

Figure 2:
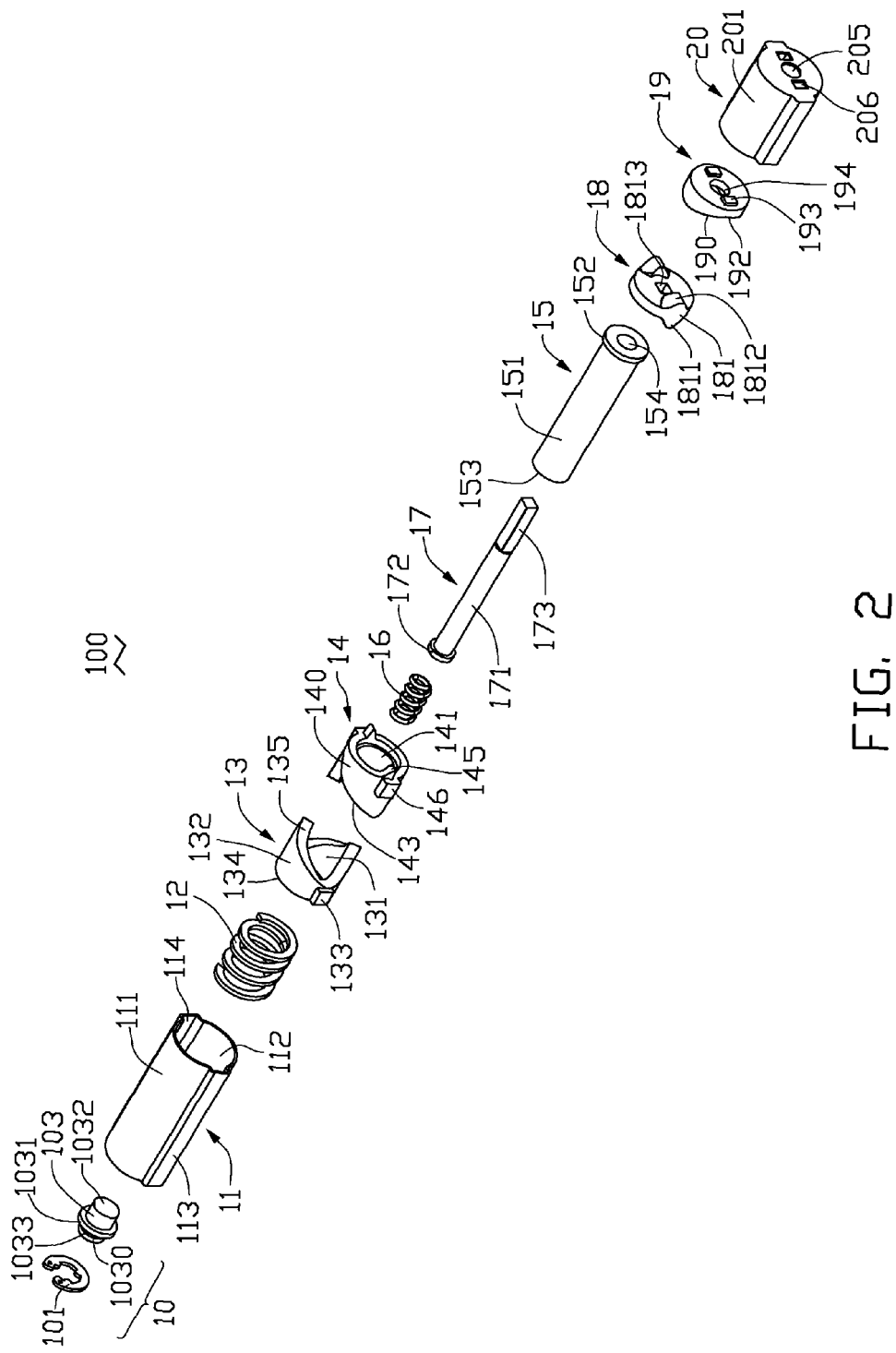
FIG. 2 is an exploded, isometric view of the exemplary embodiment of the hinge assembly shown in FIG. 1.
Figure 3:
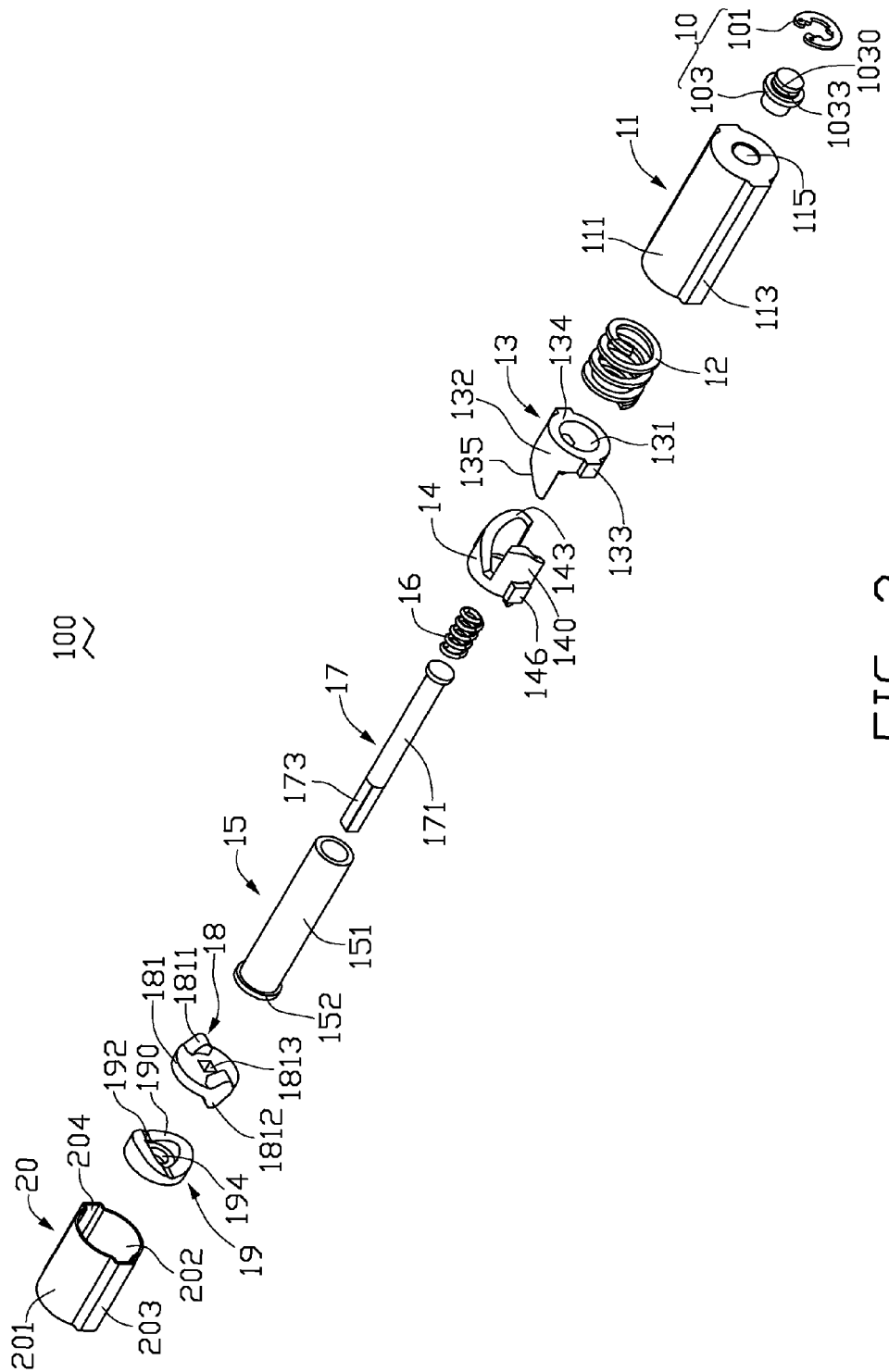
FIG. 3 is similar to FIG. 2, but viewed from another aspect.

Referring to FIGS. 2 and 3, the hinge assembly 100 in the embodiment illustrated includes a locking module 10, a first sleeve 11, a first spring 12, a cam 13, a follower 14, a barrel 15, a second spring 16, a press rod 17, a control member 18, a retaining member 19 and a second sleeve 20.

The locking module 10 includes a washer 101 and a stopper 103. The washer 101 is substantially C-shaped. The stopper 103 is substantially cylindrical, and includes an extending end 1030 and a smooth end 1032. A ring rib 1031 is formed between the extending end 1030 and the smooth end 1032. The extending end 1030 defines a loop groove 1033 for locking with the washer 101.

The first sleeve 11 is a substantially hollow cylinder, and has an outer wall 111 and an inner wall 112. The inner wall 112 is recessed toward the outer wall 111 to form two symmetrical sleeve blocks 113. Correspondingly, two sleeve grooves 114 are defined in the inner wall 112. The sleeve blocks 113 of the sleeve 11 may engage with the cover section 210 of the mobile phone 200 so that the sleeve 11 and the cover section 210 cannot rotate relative to each other. The sleeve 11 includes an open end and a partially-closed end. The partially-closed end of the sleeve 11 defines a circular hole 115 at a central area thereof.

The first spring 12 is a cylindrical helical spring (i.e., occupying a cylindrical volume). An outer diameter of the first spring 12 is smaller than the diameter of the inner wall 112 of the sleeve 11 so that the first spring 12 may be received in the first sleeve 11.

Figure 4:
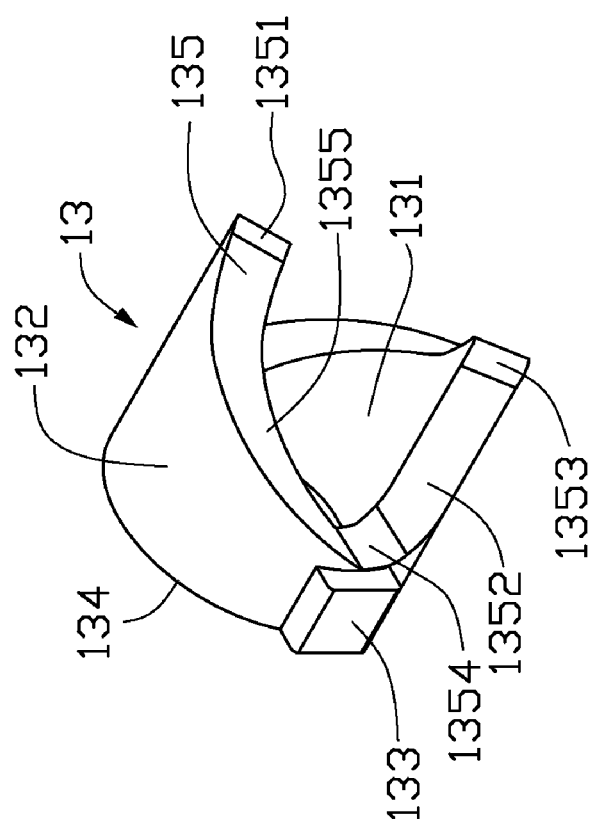
FIG. 4 is an enlarged view of the cam in FIG. 2.

Referring to FIG. 4, the cam 13 is substantially cylindrical, and has a peripheral wall 132. The diameter of the peripheral wall 132 matches the inner diameter of the first sleeve 11. The peripheral wall 132 forms two latching blocks 133 for engaging in the sleeve grooves 114 of the sleeve 11 so the cam 13 may be non-rotatably received in the first sleeve 11. The cam 13 defines a through hole 131. One end of the cam 13 has an end surface 134, and the other end of the cam 13 has a cam surface 135. The cam surface 135 includes two symmetrical peaks 1351, two vertical surfaces 1352, two connecting surfaces 1353, two symmetrical valleys 1354, and two sloped surfaces 1355 therebetween.

Figure 5:
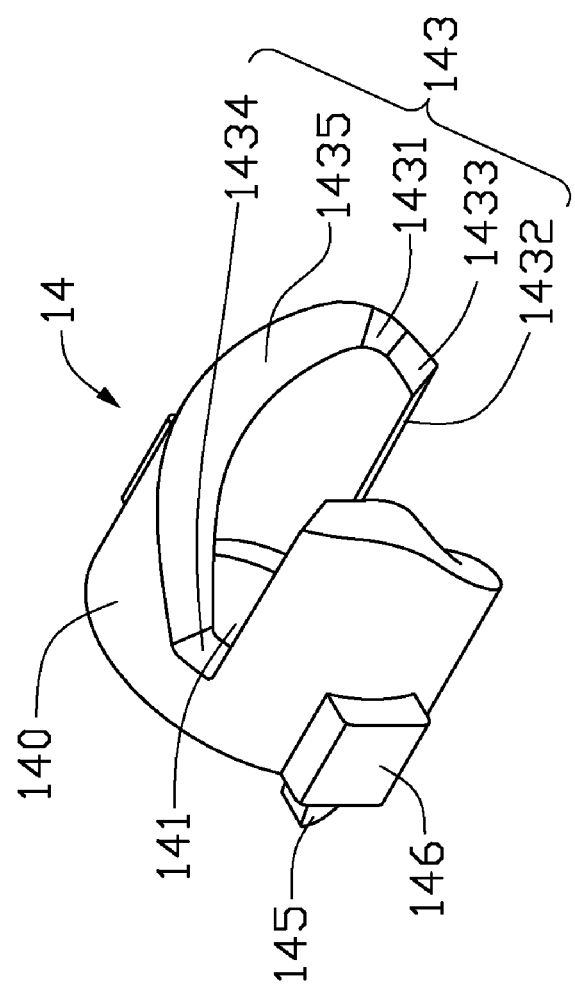
FIG. 5 is an enlarged view of the follower in FIG. 2.

Referring to FIG. 5, the follower 14 is substantially a cylinder, and includes a cylindrical circumferential wall 140. The circumferential wall 140 forms two engaging blocks 146. The follower 14 defines a through hole 141 therein. One end of the follower 14 has a latching cam surface 143, the other end thereof has two symmetrical thumb projections 145. The latching cam surface 143 includes two symmetrical peaks 1431, two symmetrical vertical surfaces 1432, two connecting surfaces 1433, two symmetrical valleys 1434, and two sloped surfaces 1425 for engaging with the cam surface 135 of the cam 13.

The barrel 15 is a hollow cylinder, and includes a barrel portion 151 and a fixing portion 152 formed at one end of the barrel portion. The barrel portion 151 defines a barrel hole 153 partially extending one part thereof. The fixing portion 152 defines a fixing hole 154 communicating with the barrel hole 153. A diameter of the barrel hole 153 is larger than the diameter of the fixing hole 154.

The second spring 16 is substantially cylindrical. A diameter of the second spring 16 is substantially equal with the diameter of the barrel hole 153 so that the second spring 16 may be received in the barrel 15.

The press rod 17 includes a flange portion 172, a rod portion 171 and a latching portion 173 integrally formed together. A diameter of the flange portion 172 is substantially equal with that of the barrel hole 153, and is larger than that of the fixing hole 154. The press rod 17 may be received in the barrel hole 153 and the fixing hole 154 of the barrel 15. The latching portion 173 is flattened at a free end thereof along a section of the curved surface area forming flat surfaces.

The control member 18 is substantially disked-shaped, includes a body 181 defining a square hole 1813. The latching portion 173 of the press rod 17 may be received in the square hole 1813. One end of the body 181 forms two symmetrical protrusions 1811 along an axial thereof, the other end of the body forms two symmetrical reverse blocks 1812. A cross section of each reverse block 1812 is substantially triangle shape.

The retaining member 19 is substantially disked-shaped. One side of the retaining member 19 symmetrically forms two convex surfaces 190. Each reverse groove 192 is defined between the convex surfaces 190. The other side of the retaining member 19 forms two fixing blocks 193. A central hole 194 is defined between the fixing blocks 193.

The second sleeve 20 is substantially cylindrical, and includes an open end and a partially-closed end. The second sleeve 20 has an outer wall 201 and an inner wall 202. The inner wall 202 is recessed toward the outer wall 201 to form two symmetrical sleeve blocks 203. Correspondingly, two sleeve grooves 204 are defined in the inner wall 202. The sleeve blocks 203 of the second sleeve 20 may engage with the body section 220 of the mobile phone 200 so that the second sleeve 20 and the body section 220 cannot rotate relative to each other. The partially-closed end of the second sleeve 20 has a round hole 205 and two receiving holes 206. Each receiving hole 206 is defined at one side of the round hole 205.

Figure 6:
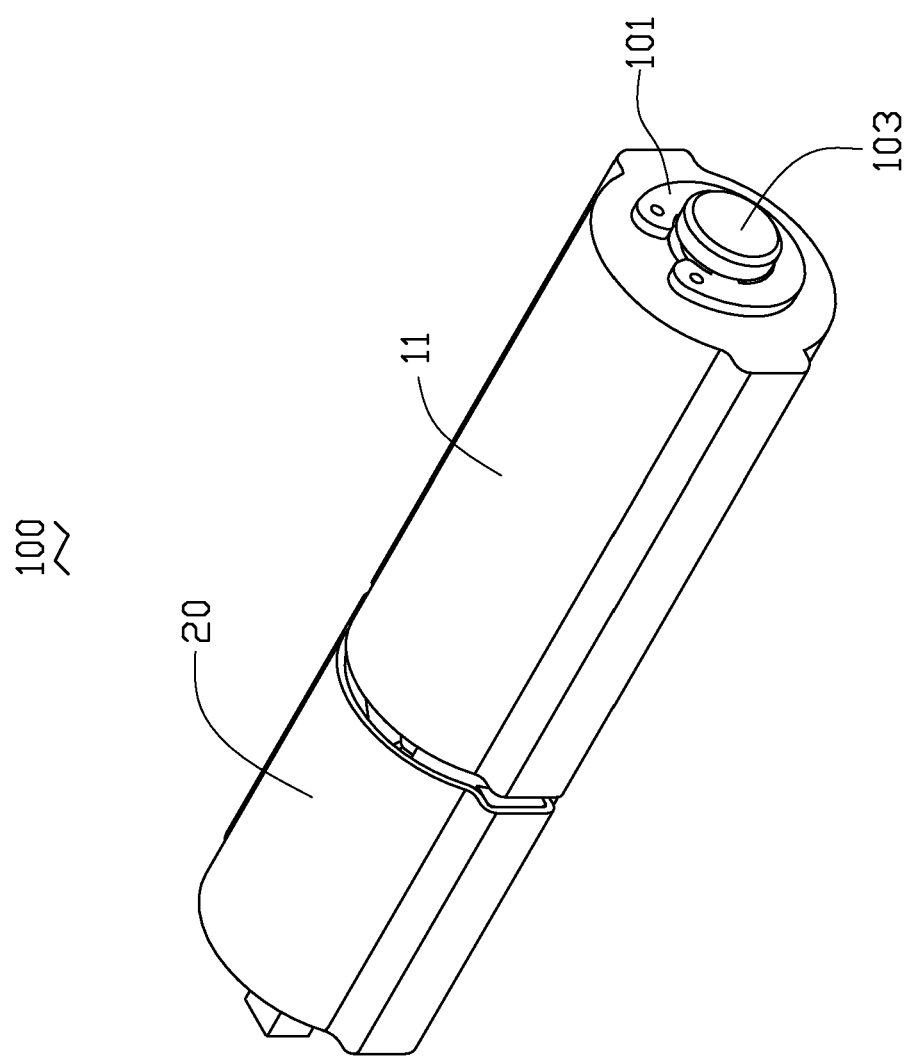
FIG. 6 is an assembled view showing the hinge assembly in FIG. 2.
Figure 7:
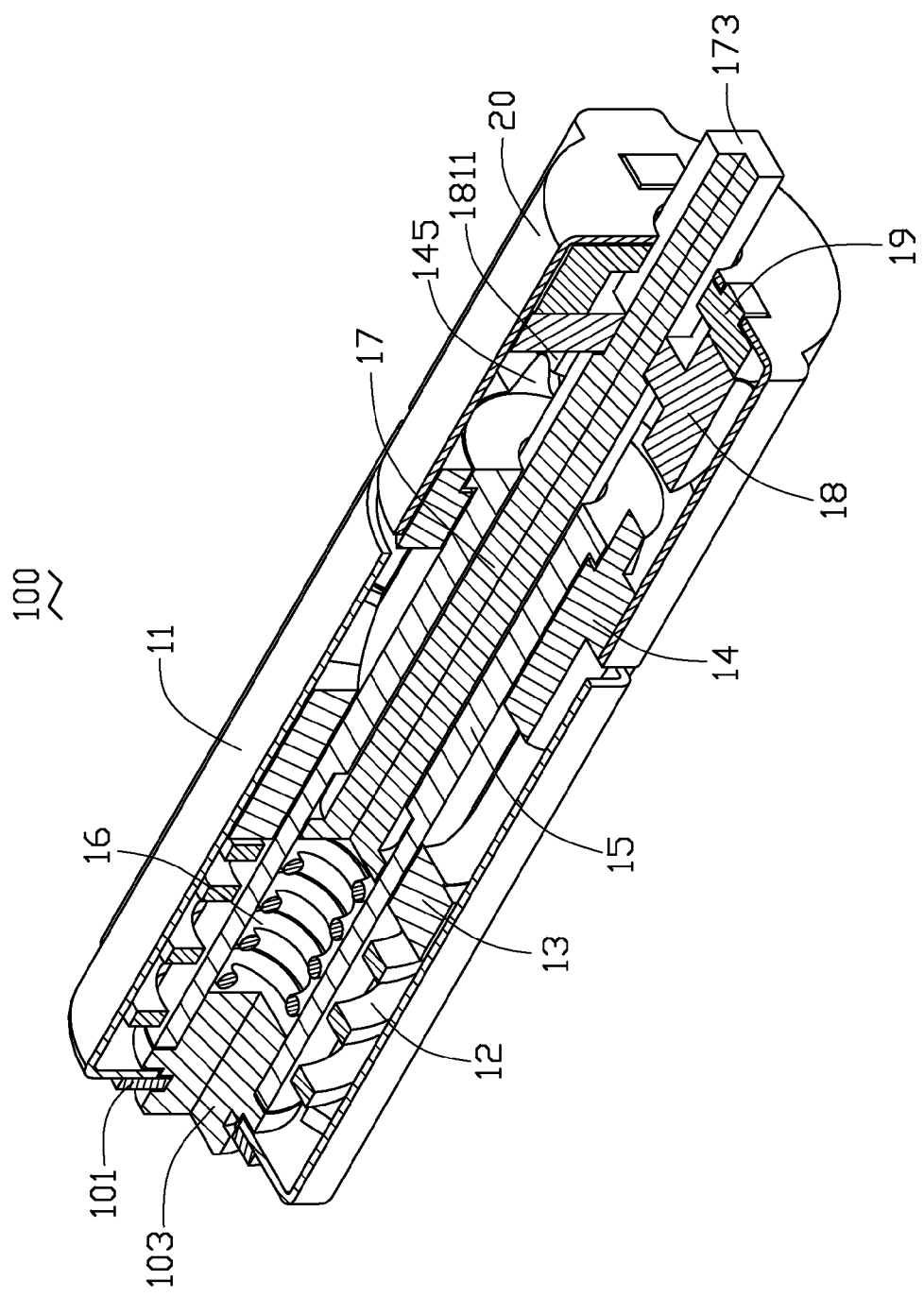
FIG. 7 is a cut-away view of FIG. 6.

In assembly, referring to FIGS. 6 to 7, one end of the barrel 15 firstly passes through the through hole 141 of the follower 14 to allow the fixing portion 152 to resist the follower 14. The cam 13 is placed around the barrel 15, with the cam surface 135 of the cam 13 engaging with the latching cam surface 143 of the follower 14. The press rod 17 is inserted into the barrel hole 153 and the fixing hole 154. The latching portion 173 extends out from the fixing hole 154. After that, the control member 18 is tightly engaged with the latching portion 173 to fix the control member 18 to the press rod 17. At the same time, the protrusions 1811 of the control member 18 resist the projections 145 of the follower 14. The second spring 16 is received in the barrel hole 153, and one end of the second spring 16 resists the flange portion 172 of the press rod 17.

After that, the smooth end 1032 of the stopper 103 presses the other end of the second spring 16 to lock in the barrel hole 153. Then, the retaining member 19 is received in the second sleeve 20 and the fixing blocks 193 are fixed in the receiving holes 206. The press rod 17 together with the above elements is received in the second sleeve 20. The reverse blocks 1812 of the control member 18 are engaged in the reverse grooves 192 of the retaining member 19. The latching portion 173 is extended out from the round hole 205 of the second sleeve 20.

Finally, the first spring 12 is placed around the barrel 15 adjacent to the cam 13. The first sleeve 11 receives the first spring 12 and the cam 13. The latching blocks 133 are received in the sleeve groove 114 of the first sleeve 11. The first sleeve 11 is pushed to compress the first spring 12 until the stopper 103 is extended out from the circular hole 115. The washer 101 is locked in the loop groove 1033. Accordingly, the hinge assembly 100 is thus completely assembled.

If incorporated into a mobile phone during manufacture, the first sleeve 11 can engage in a cavity (not shown) of the cover section 210 of the mobile phone 200, and the second sleeve 20 can connect with the body section 220 of the mobile phone 200. When the cover section 210 of the mobile phone 200 is in a fully open position, the peaks 1351 of the cam surface 135 of the cam 13 resist the valley 1434 of the latching cam surface 143. The first spring 12 exerts a predetermined pressure on the cam 13 and the follower 14. The second spring 16 exerts a predetermined pressure on the press rod 17.

When the cover section 210 of the mobile phone 200 is being closed, the cover section 210 can be closed by hand by pushing the first sleeve 11 to rotate relative to the body section 220. The first sleeve 11 further brings the cam 13 to rotate relative to the follower 14. The follower 14 limited by the second sleeve 20 cannot rotate. When the cam 13 rotates, the follower 14 is pushed to only slide along an axial direction until the cam 13 passes over the peaks 1431 of the follower 14 to hold at the connecting surface 1433. Since the follower 14 resists the fixing portion 152 of the barrel 15, a clearance exists between the protrusions 1811 of the control member 18 and the projections 145 of the follower 14. At that time, the cover section 210 becomes closed relative to the body section 220 of the mobile phone 200.

When a user wants to automatically open the cover section 210 of the mobile phone 200 automatically, he/she may press the latching portion 173 of the press rod 17 exposed from the second sleeve 11. In this process, the press rod 17 moves along an axial direction thereof until the reverse blocks 1812 break away from the reverse grooves 192 of the retaining member 19. At that time, the clearance is eliminated between the protrusions 1811 of the control member 18 and the projections 145 of the follower 14. The press rod 17 is further pressed to make the protrusions 1811 to push the projections 145. Since the control member 18 cannot rotate, the follower 14 accordingly rotates. The follower 14 brings the second sleeve 20 to rotate. The retaining member 19 rotates a small angle. Accordingly, the reverse blocks 1812 slide along the convex surfaces 190. At that time, the cam surface 135 of the cam 13 then rotates relative to the latching cam surface 143 of the follower 14 under urging of the first spring 12. Furthermore, the cam 13 brings the first sleeve 11 to rotate so that the cover section 210 of the mobile phone 200 is opened. The cam 13 stops rotating when the cover section 210 of the mobile phone 200 is completely opened. Then, the press rod 17 is released. The elastic potential energy of the second spring 16 then pushes the press rod 17 to move toward the second sleeve 20 until the reverse blocks 1812 are received in the reverse grooves 192 of the retaining member 19. The hinge assembly 100 may be opened manually.

In an alternative embodiment, the first spring 12 and the second spring 16 may be replaced by other elastic elements such as an elastic sponge.

In an alternative embodiment, the configuration of the cam surface 135 of the cam 13 may be different from the latching cam surface 143 of the follower 14 as long as the cam surfaces 135 do not interfere with the latching cam surface 143 of the follower 14.

As described above, the present invention provides a hinge assembly 100 for use with various portable devices, beyond the mobile phone illustrated, and/or with other devices needing a hinge assembly that facilitates the achievement of fully open and fully closed positions.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A hinge assembly, comprising:
a cam having a cam surface;
a follower having a latching cam surface engaging with the cam surface and at least one projection opposite to the latching cam surface;
a first spring biasing the cam surface of the cam and the latching cam surface of the follower to resist against each other;
a control member having at least one protrusion, the protrusion slidably resisting the projection of the follower;
a second spring;
a barrel defining a barrel hole, the cam, the follower and the first spring placed around the barrel;
a press rod slidably received in the barrel hole of the barrel, the control member fixed to the press rod to slide together; and
wherein a user pressing the press rod slides the control member; the protrusion of the control member interacts with the projection to rotate the follower, the second spring providing an elastic force to return the control member to an original position, whereby the cam surface of the cam rotates relative to the latching cam surface of the follower.

2. The hinge assembly as claimed in claim 1, wherein the second spring resists one end of the press rod.

3. The hinge assembly as claimed in claim 2, wherein the second spring is received in the barrel hole of the barrel.

4. The hinge assembly as claimed in claim 1, further comprising a retaining member, wherein the retaining member has at least one reverse groove, the control member has at least one reverse block, the at least one reverse block is releasably received in a corresponding reverse groove.

5. The hinge assembly as claimed in claim 4, wherein the number of the reverse groove is two, the retaining member includes two convex surfaces between the reverse grooves.

6. The hinge assembly as claimed in claim 1, further comprising a first sleeve and a stopper, the first sleeve defines a circular hole, the cam is non-rotatably connected with the first sleeve, and the stopper is received in the circular hole.

7. The hinge assembly as claimed in claim 1, further comprising a second sleeve, wherein the follower and the press rod are slidably engaged in the second sleeve.

8. A hinge assembly of a foldable electronic device comprising a main body and a flip cover, the hinge assembly comprising:
a cam having a cam surface, the cam being configured so as to be not-rotatably connected to one of the main body and the flip cover;
a follower having a latching cam surface engaging with the cam surface at one end thereof, two projections at the other end thereof, the follower configured so as to be not-rotatably connected to the other of the main body and the flip cover;
a first spring biasing the cam surface of the cam and the latching cam surface of the follower to resist against each other;
a control member having two protrusions resisting the projections of the follower
a second spring;
a barrel defining a barrel hole, the cam, the follower and the first spring placed around the barrel, the second spring received in the barrel hole;
a press rod slidably received in the barrel hole of the barrel, the control member fixed to the press rod to move together;
wherein the press rod is pressed to move the control member, the protrusion of the control member interacts with the projection to rotate the follower, the second spring provides an elastic force to return the control member to an original position, the cam further rotates relative to the follower.

9. The hinge assembly as claimed in claim 8, further comprising a retaining member, wherein the retaining member has at least one reverse groove, the control member has at least one reverse block, the at least one reverse block is releasably received in a corresponding reverse groove.

10. The hinge assembly as claimed in claim 8, further comprising a first sleeve and a second sleeve, the cam is non-rotatably connected with the first sleeve, and the follower is non-rotatably connected with the second sleeve.

11. A foldable electronic device having a body section and a cover section hinged together by a hinge assembly, the hinge assembly comprising:
a barrel defining a barrel hole;
a cam placed around the barrel, and the cam having a cam surface, the cam being not-rotatably connected to the cover section;
a follower placed around the barrel, and the follower having a latching cam surface engaging with the cam surface;
a first spring biasing the cam surface of the cam and the latching cam surface of the follower to resist against each other;
a press rod received in the barrel hole of the barrel;
a control member fixed on the press rod,
wherein the press rod is pressed to move the control member to push the follower to rotate, the cam surface of the cam rotates relative to the latching cam surface of the follower.

12. The foldable electronic device as claimed in claim 11, further comprising a retaining member, wherein the retaining member has at least one reverse groove, the control member has at least one reverse block the at least one reverse block is releasably received in a corresponding reverse groove.

13. The foldable electronic device as claimed in claim 11, further comprising a second spring, wherein the second spring resists one end of the press rod.

14. The foldable electronic device as claimed in claim 13, further comprising a sleeve and a stopper, the sleeve defines a circular hole, and the stopper is received in the circular hole.

15. The foldable electronic device as claimed in claim 11, wherein the follower forms at least one projection, the control member forms at least one protrusion, and the at least one projection slidably resists a corresponding protrusion.

16. The foldable electronic device as claimed in claim 11, further comprising a first sleeve and a second sleeve, the cam is non-rotatably connected with the first sleeve, and the follower is non-rotatably connected with the second sleeve.

* * * * *